March 1, 1932.  S. M. FRIEDMAN  1,847,645
TRANSMISSION MECHANISM
Filed July 3, 1930  2 Sheets-Sheet 1
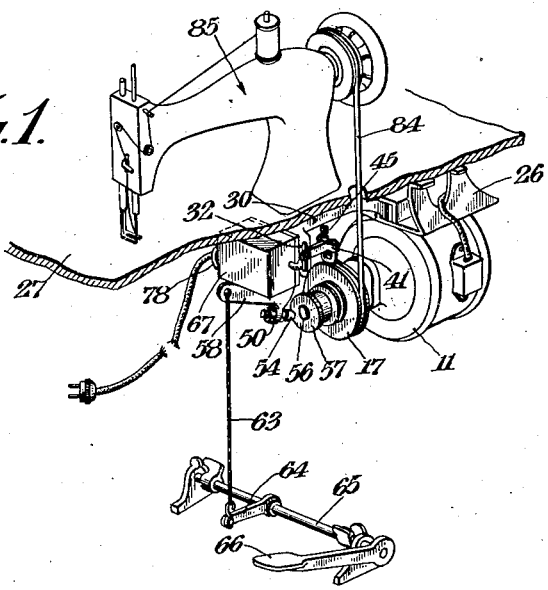
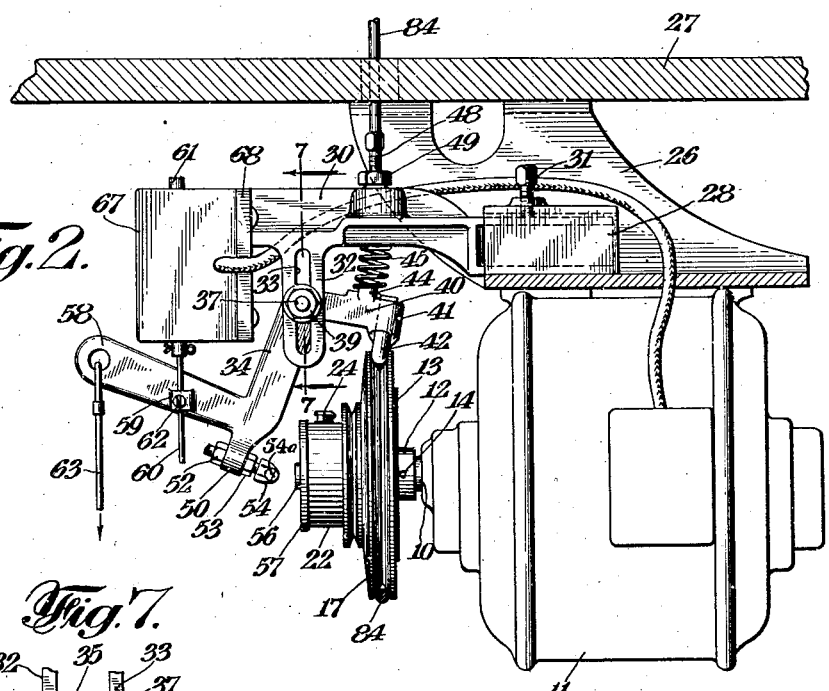
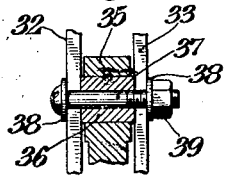
INVENTOR
Samuel M. Friedman
BY
ATTORNEY March 1, 1932. S. M. FRIEDMAN 1,847,645
TRANSMISSION MECHANISM
Filed July 3, 1930 2 Sheets-Sheet 2
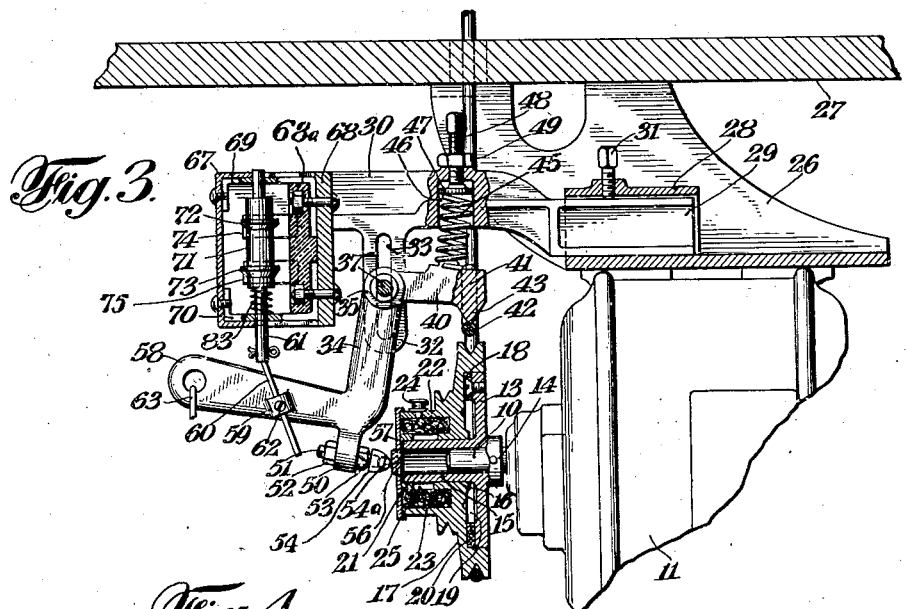
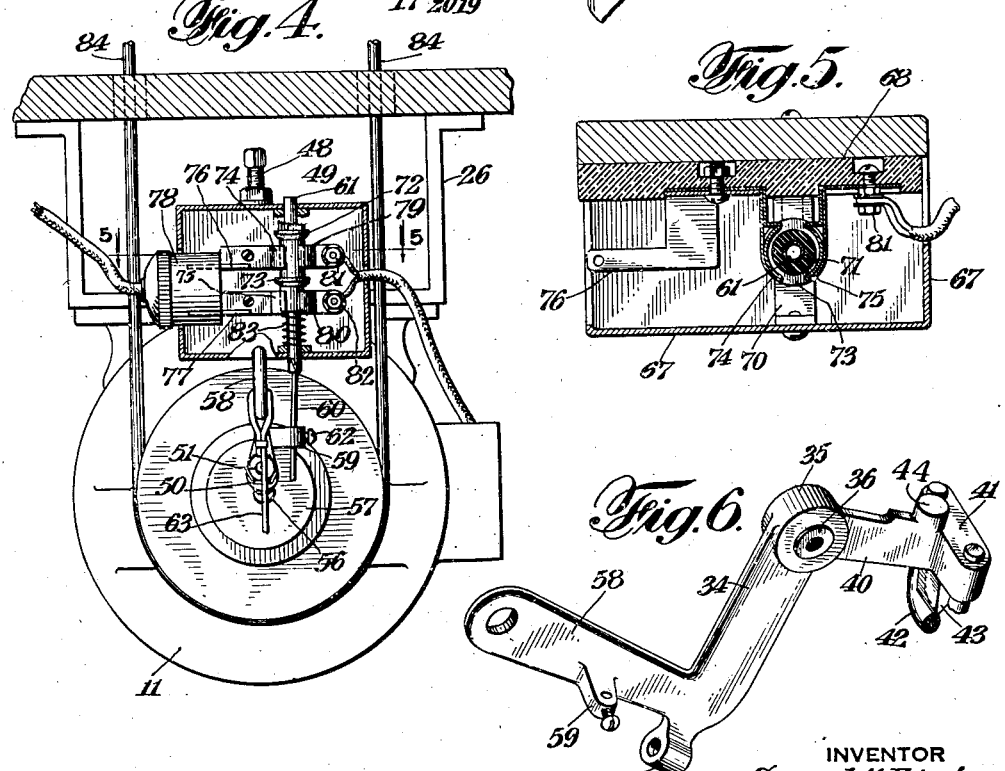
INVENTOR
Samuel M. Friedman
BY
ATTORNEY Patented Mar. 1, 1932

1,847,645

UNITED STATES PATENT OFFICE

SAMUEL M. FRIEDMAN, OF BROOKLYN, NEW YORK

TRANSMISSION MECHANISM

Application filed July 3, 1930. Serial No. 465,571.

This invention relates to transmission mechanisms, particularly of the kind adapted for use with sewing machines, although not necessarily confined to such use. An object of this invention is to provide a mechanism for intermittently transmitting the rotary motion of a motor to a machine by the operation of a hand or foot lever. Another object of my invention is to provide adjustable means of simple and inexpensive construction for connecting the mechanism to variously sized and dimensioned motors. A further object is the production of a clutch that will intermittently connect the motor with the driving mechanism and that will be automatically disconnected upon the release of the operating pedal or lever. Still another object of this invention is to provide a replaceable brake operable upon the mechanism only when the clutch is disconnected. A further object is the production of means to cause the simultaneous stopping of the motor, disconnecting of the clutch, and application of the brake, when the operating pedal or lever is released. And still a further object of my invention is to provide means of completely disconnecting both terminals of the electric switch operating the motor at the time of the release of the operating lever. Other objects, features and advantages of my invention will appear from an inspection of the drawings and the description hereinafter given.

In the accompanying drawings,

Figure 1 is a fragmentary perspective showing the general arrangement of my invention as used in conjunction with a sewing machine.

Figure 2 is a side elevation of the machanism connected to a motor, and with the brake applied to the pulley.

Figure 3 is a part sectional elevation of Figure 2, showing sections through the switch, the pulley and clutch, and through part of the bracket and frame.

Figure 4 is an end elevation of Figure 2.

Figure 5 is a section along line 5—5 of Figure 4.

Figure 6 is a perspective of the brake and clutch operating lever, showing part of the brake strap broken away.

Figure 7 is a fragmentary section taken along the line 7—7 of Figure 2.

Referring to the drawings, the armature shaft 10 of the motor 11 is keyed to the hub 12 of the clutch disc 13 by means of the set screw 14; the sleeve 15 on the other side of said disc being in rotatable and slidable engagement with the surface 16 of the bore of the pulley 17. A clutch facing ring 18 of fibrous material is attached to the disc 13 which is so positioned within the annular recess 19 of the pulley that the exposed surface of ring 18 is abuttable and frictionally engageable with the surface 20 of said recess. The pulley has a double hub consisting of the inner hub 21, and the outer concentrically arranged hub 22, the annular space between said hubs containing a fibrous lubricating packing 23, which receives its lubricant through oil valve 24 and which lubricates the sleeve 15 through the holes 25.

The motor depends from the support 26 which is secured to the underside of the table 27 and which contains the hollow member 28 adapted to receive and support the bar 29 of the bracket 30. This bar 29 is in horizontal slidable engagement with the member 28 and is held fixed thereto in a set position by the set screw 31. Forming a part of the bracket 30 is the bifurcated arm 32 which has a vertical slot 33 therethrough, and in which the lever 34 is set in pivotal and slidable engagement. The boss 35 of said lever contains in rotatable engagement therewith the bushing 36, which extends beyond the sides of said boss and which is in slidable engagement with the walls of slots 33, the entire lever being free and away from said arm 32. Extending through the slots 33 and the bushing 36 is the bolt 37, over which are mounted the washers 38 abutting the outer walls of arm 32, the nut 39 being in threaded engagement with the said bolt.

The arm 40 of the lever carries at its extremity the brake block 41 which contains two holes through which the ends of the U-shaped brake strap 42 are detachably fastened, the wedge shaped element 43 serving as an abutment for said strap. On the upper surface of arm 40 is the boss 44 over which the end of the helical spring 45 fits, the upper part of said spring being positioned in the recess 46 of the bracket 30. The upper extremity of said spring is in abutment with the disc 47, the top of which is in engagement with the bolt 48 which is in threaded engagement with a hole extending into said recess, the nut 49 serving the purpose of locking the bolt in a fixed position.

At the bottom of the lever 34 is the hollow boss 50 through which extends the stud 51 the position of which is regulated by the nuts 52 and 53. In threaded engagement with the end of this stud is an abutter member comprising the cap 54 and the ball 54a which is abuttable with the boss 56 of the cover plate 57, the latter being secured to the hub 22 of the pulley.

The arm 58 of the lever 34 contains the lug 59 which contains a hole through which extends the link 60 in slidable engagement therewith, the upper end of said link being pivotally attached to the bottom of the switch rod 61. The set screw 62 serving the purpose of holding the link 60 fixed in a predetermined position. Pivotally attached to the end of the arm 58 is the link 63 which is connected to an arm 64 keyed to the shaft 65 to which is attached the treadle 66. Although the drawings show a foot operated mechanism, the arm 58 could be linked with a hand operated lever of substantially similar construction.

The motor controlling switch is housed in the box 67 which is attached to the wall 68 of the bracket 30. Secured to the insulating wall 68a of the switch are the brackets 69 and 70, the forward portions of which are bent to serve as a support for the box 67. The upper and lower portions of the switch rod 61 extend through and are in slidable engagement with holes in the brackets 69 and 70 respectively. Mounted over said switch rod 61 is the cylinder 71 made of insulating material, and superimposed upon this cylinder are the metallic contact rings 72 and 73 of frustro conical shape. The contact elements 74 and 75 are electrically connected to the prongs 76 and 77 respectively, these prongs being attachable to the house current plug 78; and the contact elements 79 and 80 are electrically connected to the terminals 81 and 82 respectively, these terminals being electrically connected to the corresponding terminals on the motor. The said contact elements 74, 75, 79 and 80 contain cylindrical segments, the inner surfaces of which are shaped and proportioned to fit over and contact with the said rings 72 and 73,— as will be clearly seen from an examination of Figure 5. Mounted over the switch rod 61 is the helical spring 83, positioned between the bottom end of the cylinder 71 and the bracket 70. This spring normally keeps the contact rings 72 and 73 out of contact with the elements 74, 75, 79 and 80.

To start the machine, the treadle 66 is depressed, causing a downward movement of arm 58, and a consequent downward movement of link 60 and the switch rod 61, thereby carrying the cylinder 71 with it and causing the ring 72 to contact with the elements 74 and 79, and the ring 73 with the elements 75 and 80; and in this way closing the circuit through the motor. The downward movement of the arm 58 causes the lever 34 to rotate about its pivot in slot 33, resulting in an upward movement of the arm 40 against the action of the spring 45, and thereby releasing the pulley from the grip of the brake strap 42. At the same time, the ball 54a in the abutter cap 54 is brought into contact with the boss 56, forcing the pulley to slide over sleeve 15 against the ring 18 of the clutch disc 13. Frictional contact is thus established between the clutch and the pulley so that the rotary motion of the motor is transmitted through the clutch to the pulley and cord 84, to operate the machine 85.

When the treadle is released, the spring 45 forces the arm 40 downwards so that the brake strap 42 engages the pulley to stop its rotation, the abutter member containing the ball 54a is disengaged from the boss 56 and the switch rod 61 is caused to move upwards, to disengage the rings 72 and 73 from their respective contact elements, and thereby breaking the motor circuit.

It will thus be noticed that one movement of the operating treadle is effective in producing a triple result, comprising the simultaneous operation of the motor switch, the braking apparatus, and the clutch engaging mechanism. For practical purposes it is best to so design the parts that the brake will be released slightly before the circuit is closed through the motor, so as to leave the pulley free to rotate the instant the motor starts.

It frequently happens that motors of different dimensions are used; hence to provide for variously sized and dimensioned motors, the adjustable bracket 30 is employed in my invention. To provide for different widths of motors and for horizontal adjustment of the brake strap 42 and the cap 54 with reference to the pulley, the bar 29 is made slidably adjustable within member 28. To provide for different heights of motors and for vertical adjustment, the pivotal point of the lever 34 is made moveable within the slot 33. If the tension of the spring 45 should become lessened due to the lowering of said pivotal point, the adjusting bolt 48 can be turned to produce the necessary tension in said spring. The position of the cap 54 with reference to the boss 56 is also subject to adjustment, by the manipulation of the stud 51 and nuts 52 and 53. As the ball 54a is free to rotate within the cap 54, there will be a minimum of friction between the ball and the boss 56, thereby reducing wear on said ball and practically eliminating noise at the time of contact.

It should also be observed that the lever is always free to pivot about its axis, as it is rotatably mounted over the bushing 36 which is held fixed within the slot by the bolt 37 and nut 39,—the sides of the lever being free from the arm 32.

The detachability of the brake strap 42 enables immediate replacement to be made of a worn out strap with a new one, the arrangement being such as to make this operation exceedingly simple. Although the brake strap is held in place merely by its frictional engagement with the holes in the brake block 41, it is not readily subject to accidental disengagement, as the pressure of the pulley against it is in an upward direction, so that it is constantly being forced more firmly into place.

Another outstanding feature of my invention is the arrangement whereby both terminals of the switch are disconnected from the motor at the time of the breaking of the circuit, instead of having a single break in the circuit, as is generally the case. As a result of this construction, the motor is completely disconnected from any source of current whatsoever, thereby eliminating all danger of short circuiting the motor when the apparatus is not in operation.

This invention is not limited to the particular design disclosed herein, as within its scope may be embodied many other and different forms of construction.

What I claim is:

1. In a transmission mechanism, a bracket, a motor supported by said bracket, an electric switch mounted on said bracket, a pulley, a clutch keyed to the armature shaft of said motor and engageable with said pulley, a brake operable upon said pulley; a lever having thereon means to simultaneously operate said switch, said clutch and said brake; and means to actuate said lever; and yieldable means operable upon said lever and adjustably secured to said bracket.

2. In a transmission mechanism, a bracket, a motor supported by said bracket, a switch mounted on a wall of said bracket, a pulley, a clutch keyed to the armature shaft of said motor and engageable with said pulley, a brake operable upon said pulley; a lever having thereon means to simultaneously operate said switch, said clutch and said brake; the pivotal point of said lever being slidably adjustable horizontally and vertically with reference to said pulley; and means to actuate said lever; and yieldable means operable upon said lever and adjustably secured to said bracket.

3. In a transmission mechanism, a motor, a switch electrically connected to said motor, a pulley, a clutch keyed to the armature shaft of said motor, and engageable with said pulley, a brake operable upon said pulley, a spring for actuating said brake; a lever having thereon means to simultaneously operate said switch, said clutch and said brake; a bracket comprising a horizontally disposed bar, a recessed portion for receiving said spring, a wall for supporting said switch, a bifurcated arm having a vertical slot therein; said lever being provided with a pivot in slideable engagement with said slot; means to hold said pivot fixed in a predetermined position within said slot; and a supporting member adapted to slideably receive said bar.

4. In a transmission mechanism, a bracket, a motor supported by said bracket, a switch mounted on a wall of said bracket, a pulley, a clutch keyed to the armature shaft of said motor and engageable with said pulley; an abutter member abuttable with said pulley and adapted to move it into frictional engagement with said clutch; a lever having its fulcrum slidably adjustable horizontally and vertically with reference to said pulley, one of the arms of said lever carrying a brake block with two holes therein and a U-shaped brake strap having its ends extending through and in frictional engagement with said holes, the other arm of said lever carrying said abutter member and means to actuate said switch; and yieldable means adjustably secured to said bracket for normally keeping said brake strap in engagement with said pulley.

5. In a transmission mechanism a motor, a switch electrically connected to said motor, a pulley, a clutch keyed to the armature shaft of said motor and engageable with said pulley, a lever having its fulcrum adjustable horizontally and vertically with reference to said pulley, one of the arms of said lever carrying a brake block with two holes therein and a U-shaped brake strap having its ends extending through and in frictional engagement with said holes, the other arm of said lever having thereon a hollow boss in proximity to one end of said pulley and a lug in proximity to said switch; a stud extending through said boss and carrying at one end a cap abuttable with said end of said pulley; means to adjustably secure said stud to said boss; said lug having attached thereto means to actuate said switch; a bracket containing a vertical slot therein; a bushing in slidable engagement with said slot; said lever being rotatably mounted over said bushing; and means to hold said bushing in a fixed predetermined position within the slot.

6. In a transmission mechanism, a clutch comprising a disc, a clutch facing attached thereto, a hub keyed to the armature shaft of the motor, and a cylindrical sleeve; a pulley mounted on said sleeve and in slidable and rotatable engagement therewith, said pulley having two concentric hubs separated by an annular chamber adapted to receive lubricating packing; a cover plate secured to the outer of said concentric hubs and adapted to seal said chamber; a recess in said pulley adapted to receive said clutch disc, one wall of said recess being adapted for frictional engagement with said clutch facing; an abutter member comprising a cap and a rotatable ball therein abuttable with said plate and adapted to slideably push said pulley over said sleeve; and means to actuate said abutter member.

7. In a transmission mechanism, a bracket, a motor supported by said bracket, a switch mounted on said bracket and containing a pair of contact elements adapted for connection to a source of current supply, another oppositely positioned pair of contact elements electrically connected to said motor, and a rod carrying two metallic rings insulated from each other; a lever mounted on said bracket and operatively connected to said rod so as to cause each of said rings to electrically connect one of said elements with its corresponding oppositely positioned element; and yieldable means to normally keep said elements and rings disengaged.

8. In a transmission mechanism, a bracket, a motor supported by said bracket, a switch electrically connected to said motor, said switch comprising an insulating wall secured to said bracket and to which are secured two oppositely positioned brackets each having a hole therein, a rod extending through said holes, an insulating cylinder mounted over said rod, two contact rings of frustro conical shape fixed upon said cylinder and separated from each other; a pair of contact elements, another oppositely positioned pair of contact elements, each of said contact elements containing cylindrical segments adapted to fit over and contact with said rings; a link pivotally connected to the bottom end of said rod; a lever mounted on said first-mentioned bracket and being operatively connected to said link as to cause a movement of said rod whereby said rings are brought into contact with said elements; and yieldable means to normally keep said elements and rings disengaged.

In testimony whereof I affix my signature.

SAMUEL M. FRIEDMAN.